(12) United States Patent
Kim (10) Patent No.: US 6,845,188 B2
(45) Date of Patent: Jan. 18, 2005

(54) DC WDM DEVICE AND DC WDM SYSTEM AND TRANSMISSION NETWORK USING THE SAME

(75) Inventor: Byeong-Hoon Kim, Suwon-shi (KR)

(73) Assignee: SamSung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 10/215,037

(22) Filed: Aug. 9, 2002

(65) Prior Publication Data

US 2003/0053748 A1 Mar. 20, 2003

(30) Foreign Application Priority Data

Sep. 17, 2001 (KR) ........................................ 2001-57134

(51) Int. Cl.[7] ................................................ G02B 6/28
(52) U.S. Cl. .............................. 385/24; 385/37; 398/79
(58) Field of Search ............................. 385/24, 15, 31, 385/37; 398/43, 58–60, 79, 82–84, 87, 93

(56) References Cited

U.S. PATENT DOCUMENTS

| | | | |
|---|---|---|---|
| 5,555,118 A | 9/1996 | Huber | 398/72 |
| 6,181,467 B1 * | 1/2001 | Jung et al. | 359/341.31 |
| 6,233,074 B1 | 5/2001 | Lahat et al. | 398/79 |
| 6,317,239 B1 * | 11/2001 | Burbidge et al. | 398/160 |
| 6,344,925 B1 | 2/2002 | Grubb et al. | 359/345 |
| 6,381,384 B2 | 4/2002 | Solheim et al. | 385/24 |
| 6,404,522 B1 | 6/2002 | Handelman | 398/79 |
| 2001/0046348 A1 * | 11/2001 | Sarkimukka et al. | 385/24 |

FOREIGN PATENT DOCUMENTS

| | | | | |
|---|---|---|---|---|
| EP | 810699 A2 * | 12/1997 | | H01S/3/06 |
| EP | 964275 A1 * | 12/1999 | | G02B/6/293 |
| JP | 07281219 A * | 10/1995 | | G02F/1/35 |
| JP | 09015422 A * | 1/1997 | | G02B/6/00 |
| JP | 2000012937 A * | 1/2000 | | H01S/3/10 |
| WO | WO 02/11336 | 2/2002 | | |

* cited by examiner

Primary Examiner—Diane I. Lee
(74) Attorney, Agent, or Firm—Robert E. Bushnell, Esq.

(57) ABSTRACT

The invention adds a function of Wavelength-Division-Multiplexing (WDM) to conventional transmission units to enlarge the transmission capacity. The DC WDM device of the invention includes a first WDM coupler module for inputting a first WDM optical signal subjected to transmission and a first optical signal of a fixed wavelength to wavelength-division-multiplex the signals, and a second WDM coupler module for demultiplexing a transmitted WDM optical signal to divide the same into a second optical signal of the fixed wavelength and a second WDM optical signal of the remaining wavelengths. The WDM system of the invention includes a pair of DC WDM sub-systems connected to each other via optical transmission/receiving channels for transmitting/receiving WDM optical signals, where one of the DC WDM sub-systems includes a plurality of transmission units for transmission/receiving optical signals of fixed wavelengths into and from corresponding transmission units of the other DC WDM sub-system, a plurality of DC WDM devices connected to one another into the shape of a daisy chain while coupled to said transmission units in one-to-one relation, and a fiber amplifier connected between said optical transmission/receiving channels and one of said DC WDM devices subjected to connection to said channels.

9 Claims, 5 Drawing Sheets

DC WDM DEVICE AND DC WDM SYSTEM AND TRANSMISSION NETWORK USING THE SAME

CLAIM OF PRIORITY

This application makes reference to, incorporates the same herein, and claims all benefits accruing under 35 U.S.C. §119 from an application for DAISY CHAIN WAVELENGTH DIVISION MULTIPLEXING DEVICE AND DAISY CHAIN WAVELENGTH DIVISION MULTIPLEXING SYSTEM AND TRANSMISSION NETWORK UTILIZING THE DEVICE earlier filed in the Korean Industrial Property Office on 17 Sep. 2001 and there duly assigned Serial No. 2001-57134.

BACKGROUND OF THE INVENTION

1. Field of the Invention

The present invention relates to an optical transmission system, more particularly, to an optical Wavelength-Division-Multiplexing (i.e., "WDM") system. Furthermore, particularly, the invention relates to a WDM device and a WDM system and transmission network using the same.

2. Description of the Related Art

The existing transmission systems confront insufficient transmission capacities as the amount of information used by individuals rapidly increases in the Internet, multimedia communication, electronic commerce, and so on. In order to cope with the above situation, a WDM mode tends to gradually spread. The WDM mode is one of transmission modes for transmitting optical signals, by which a plurality of optical signals having wavelengths different from one another are simultaneously guided to a piece of optical fiber. In the WDM mode, wavelength-division-multiplexing means multiplexing the optical signals with different wavelengths into the one piece of optical fiber. On the contrary, wavelength-division-demultiplexing means dividing the optical signals multiplexed in the one piece of optical fiber.

This WDM transmission technology is a method which can increase transmission capacity in the easiest way in the optical communication, and a WDM system adopting the WDM transmission technology is getting rapidly commercialized. This movement is spreading to the overall transmission network so that the range thereof is extending from a metro area to an access area as well as the backbone network.

A basic construction of a typical WDM system in use for the backbone network is illustrated by a 4 channel WDM system for the sake of convenience. Channel transmitters generate optical signals of wavelengths according to their channels based upon the WDM standards in response to electric signals subjected to transmission according to their channels, and apply the optical signals to a WDM multiplexer. The WDM multiplexer wavelength-division-multiplexes the optical signals of channels which are transformed by the channel transmitters into one optical fiber, and transmits the WDM signal into an optical transmission channel. The optical transmission channel is provided with optical amplifiers for compensating losses occurring to the WDM optical signal while it propagates along the optical fiber and optical devices. A WDM demultiplexer receives the WDM optical signal propagated as above and divides the WDM optical signal into optical signals according to the wavelengths via wavelength-division-demultiplexing. Channel receivers transform the optical signals divided with the WDM demultiplexer into electric signals via photoelectric transformation.

In the WDM system in use for the backbone network as above, those portions common to each wavelength such as the WDM multiplexer, the optical amplifier and the WDM demultiplexer are necessarily installed at the initial stage.

However, compared to the WDM system used in the backbone system, the WDM system used in the metro area or the access area requires a comparatively low cost, has a small amount of system capacity and is relatively restricted in use of an Erbium-Doped Fiber Amplifier (i.e., "EDFA").

Therefore, in an area such as the metro/access area requiring a relatively cheap system compared to the backbone network, it is burdensome in respect of the initial installation cost to install the expensive WDM system such as the WDM system used in the backbone network and thus it is difficult to adopt the WDM mode.

SUMMARY OF THE INVENTION

Accordingly, the present invention has been made to solve the foregoing and other problems and it is an object of the present invention to provide a WDM device, which can simply add a WDM function to a conventional transmission unit to enlarge the transmission capacity, and a WDM system and transmission network using the same.

It is another object of the invention to provide a WDM device, which can embody a WDM system capable of being enlarged without stopping an existing service when the transmission capacity should be enlarged, and the WDM system and a transmission network using the same.

In order to obtain the above objects, the present invention disperses the wavelength-division-multiplexing/demultiplexing function across transmission units by connecting optical signals in the shape of DC or Daisy Chains while using the transmission units in the point-to-point connection to realize the WDM system thereby enlarging the transmission capacity. Accordingly, the function of the WDM system can be realized in conventional transmission units as well as the initial installation cost can be reduced.

Hereinafter in the present invention, devices for connecting the optical signals from the transmission units into the shape of DC to add the function of wavelength-division-multiplexing/demultiplexing to the transmission units will be referred to as "DC WDM devices", the WDM system embodied using the such DC WDM devices will be referred to as "DC WDM system", and a transmission network embodied using the DC WDM devices and the DC WDM systems will be referred to as "DC WDM transmission network."

The DC WDM device of the invention includes: a first WDM coupler module for inputting a first WDM optical signal subjected to transmission and a first optical signal of a fixed wavelength to wavelength-division-multiplex the signals; and a second WDM coupler module for demultiplexing a transmitted WDM optical signal to divide the same into a second optical signal of the fixed wavelength and a second WDM optical signal of the remaining wavelengths.

The WDM system using the DC WDM devices of the invention includes: a pair of DC WDM sub-systems connected to each other via optical transmission/receiving channels for transmitting/receiving WDM optical signals, wherein one of the DC WDM sub-systems includes: a plurality of transmission units for transmission/receiving optical signals of fixed wavelengths into/from corresponding transmission units of the other DC WDM sub-system; a plurality of DC WDM devices connected to one another into the shape of a daisy chain while coupled to said transmission units in one-to-one relation; and a fiber amplifier connected between said optical transmission/receiving channels and one of said DC WDM devices subjected to connection to said channels.

The transmission network using the DC WDM devices of the invention includes: two pairs of DC WDM systems connected to each other via optical transmission/receiving channels for transmitting/receiving WDM optical signals, wherein one of the DC WDM systems includes: a plurality of transmission units for transmission/receiving optical signals of fixed wavelengths into/from corresponding transmission units of the other DC WDM systems; a plurality of DC WDM devices connected to one another into the shape of a daisy chain while coupled to said transmission units in one-to-one relation; and a fiber amplifier connected between said optical transmission/receiving channels and one of said DC WDM devices subjected to connection to said channels; and a pair of Optical Add/Drop Multiplexers (OADMs) respectively connected between said DC WDM systems for adding/dropping the WDM optical signals transmitted between said DC WDM systems.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
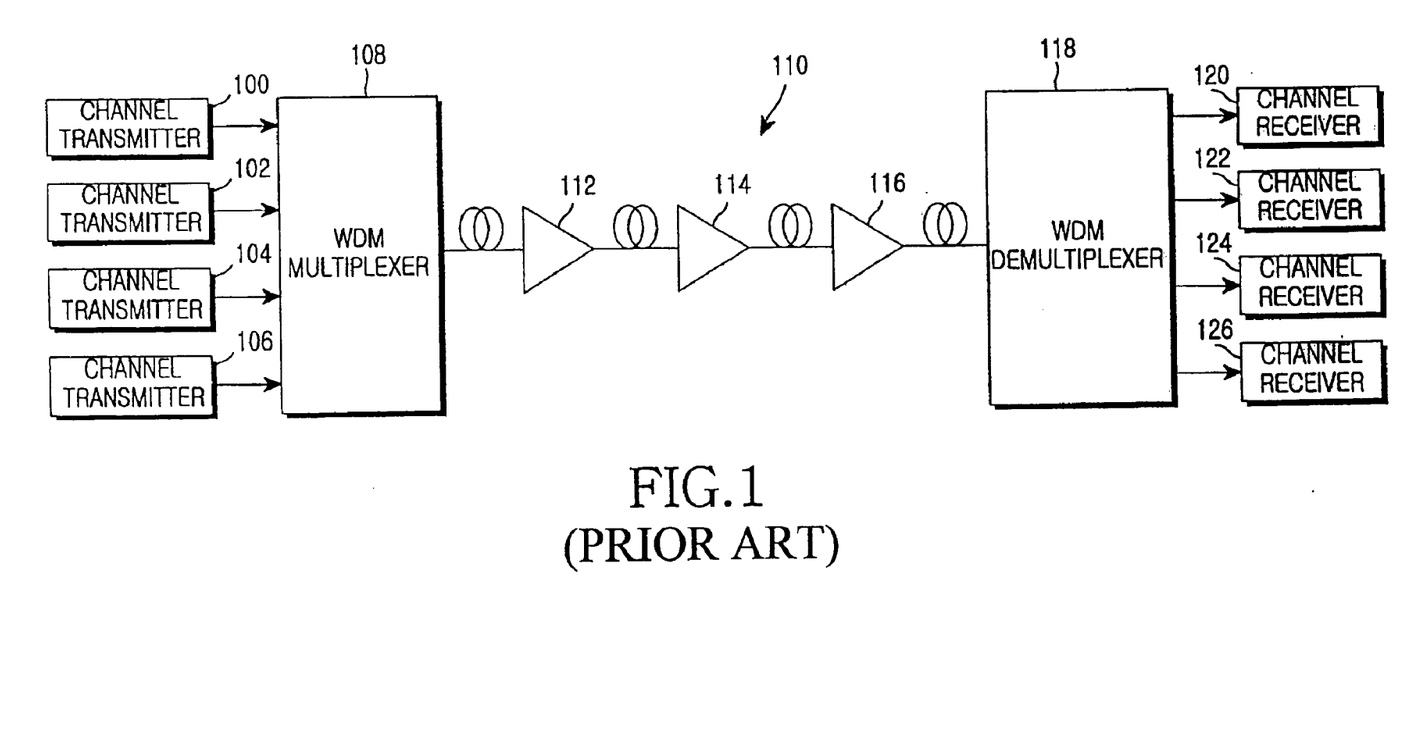
FIG. 1 is a block diagram illustrating the construction of a general WDM system.

A basic construction of a typical WDM system in use for the backbone network is as shown in FIG. 1, which illustrates 4 channel WDM system for the sake of convenience. Referring to FIG. 1, channel transmitters 100 to 106 generate optical signals of wavelengths according to their channels based upon the WDM standards in response to electric signals subjected to transmission according to their channels, and apply the optical signals to a WDM multiplexer 108. The WDM multiplexer 108 wavelength-division-multiplexes the optical signals of channels which are transformed by the channel transmitters 100 to 106 into one optical fiber, and transmits the WDM signal into an optical transmission channel 110. The optical transmission channel 110 is provided with optical amplifiers 112 to 116 for compensating losses occurring to the WDM optical signal while it propagates along the optical fiber and optical devices. A WDM demultiplexer 118 receives the WDM optical signal propagated as above and divides the WDM optical signal into optical signals according to the wavelengths via wavelength-division-demultiplexing. Channel receivers 120 to 126 transform the optical signals divided with the WDM demultiplexer 118 into electric signals via photoelectric transformation.

The following detailed description will present a preferred embodiment of the invention in reference to the accompanying drawings, in which well-known functions or constructions will not be described in detail since they would unnecessarily obscure the understanding of the invention.

Figure 2:
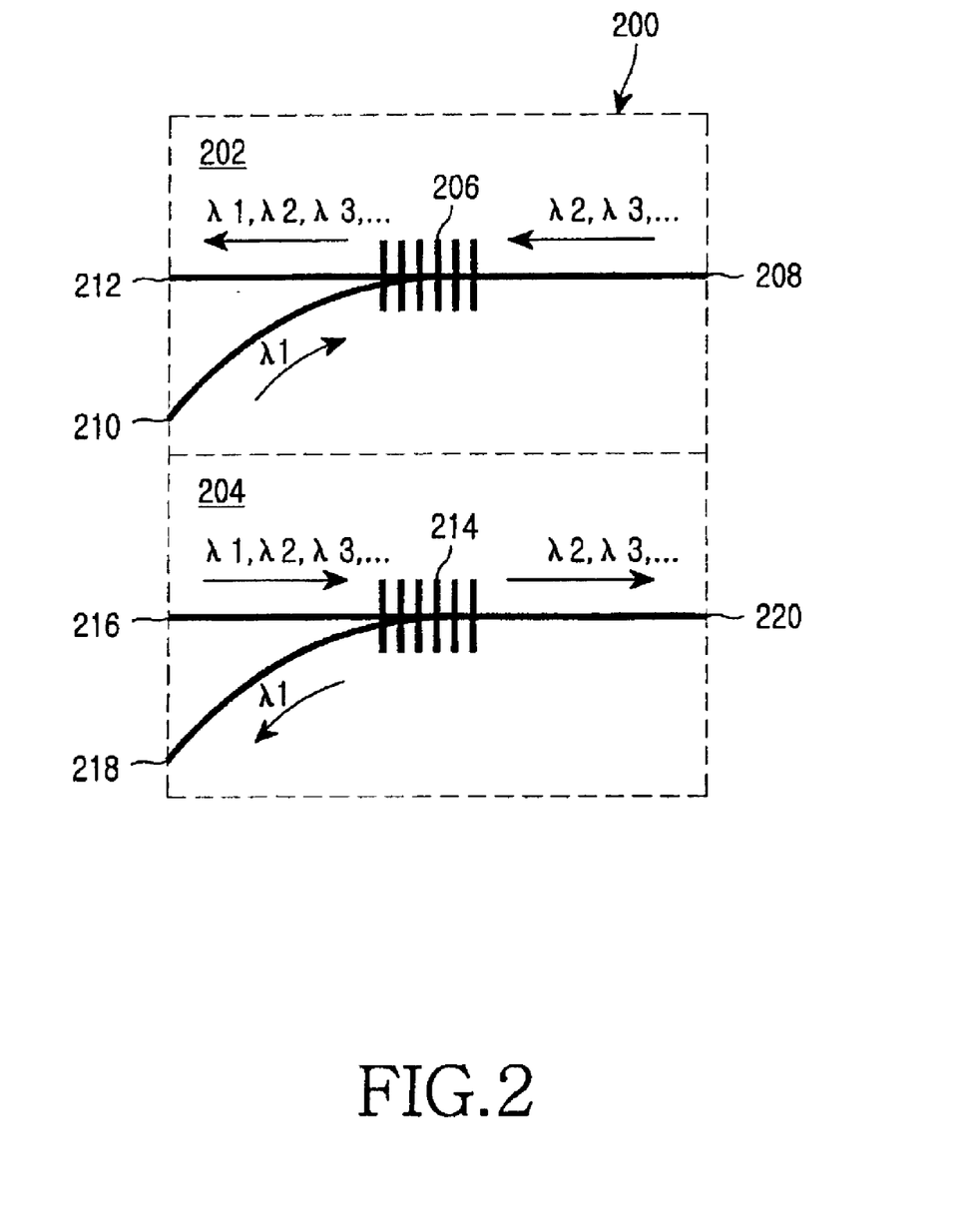
FIG. 2 illustrates the construction of a DC WDM device according to a preferred embodiment of the invention.

FIG. 2 illustrates the construction of a DC WDM device according to a preferred embodiment of the invention, in which the DC WDM includes the first WDM coupler module 202 having a WDM coupler 206 and the second WDM coupler module 204 having a WDM coupler 214. In general, the WDM coupler is made of a Fiber Bragg Grating (i.e., "FBG"), an Arrayed Waveguide Grating (i.e., "AWG") and the like. The WDM couplers 206 and 214 in FIG. 2 utilize, for instance, "WD 1515 100 GHz Spaced ITU-Channel WDM couplers" or "WD 1515 200 GHz Spaced ITU-Channel WDM couplers" commercially available from JDS UNIPHASE.

In the first WDM coupler module 202, an optical signal of a fixed wavelength is inputted into an optical signal input terminal 210 while a WDM optical signal subjected to transmission are inputted into a WDM input terminal so that the WDM coupler 206 outputs the WDM optical signal subjected to transmission and the optical signal of the one fixed wavelength to a WDM output terminal 212 by executing wavelength-division-multiplexing to the same. In this case, the first WDM coupler module 202 not only inputs the WDM optical signal subjected to transmission to the WDM input terminal 208 but also inputs the optical signal of the one fixed wavelength to the optical signal input terminal 210 so that the WDM optical signal and the optical signal of the one fixed wavelength may be outputted to the WDM output terminal 212 after executing the wavelength-division-multiplexing to the same by the WDM coupler 206. In this case, the WDM coupler 206 transmits the WDM optical signal, which is inputted to the WDM input terminal 208, toward the WDM output terminal 212 while reflects the optical signal inputted to the optical input terminal 210 toward the WDM output terminal 212. Accordingly, if the WDM optical signal inputted into the WDM input terminal 208 has wavelength-division-multiplexed wavelengths $\lambda 2$, $\lambda 3$, . . . while the optical signal inputted into the optical signal input terminal 210 has a wavelength $\lambda 1$, for example, as shown in FIG. 2, the WDM output terminal 212 outputs a new WDM optical signal with the wavelength-division-multiplexed wavelengths $\lambda 1$, $\lambda 2$, $\lambda 3$, . . .

The second WDM coupler module 204 inputs the transmitted WDM optical signal to the WDM input terminal 216 to wavelength-division-demultiplex the same with the WDM coupler 214 to divide the optical signal of the fixed wavelength from the WDM optical signal of the remaining wavelengths. The optical signal of the fixed wavelength is outputted to an optical signal output terminal 218, and the optical signal of the remaining wavelengths is outputted to an WDM output terminal 220. Herein, the WDM coupler 214 selectively reflects the optical signal of the fixed wavelength from the WDM optical signal inputted toward the optical signal output terminal 218 while transmits the WDM optical signal of the remaining wavelengths toward the WDM output terminal. Accordingly, if the WDM optical signal inputted into the WDM input terminal 208 has wavelength-division-multiplexed wavelengths $\lambda 1$, $\lambda 2$, $\lambda 3$, . . . while the optical signal to be outputted to the optical signal output terminal 218 has a wavelength λ1, for example, as shown in FIG. 2, the optical signal output terminal outputs the optical signal of the wavelength λ1 and the WDM output terminal 220 outputs a WDM optical signal having the wavelength-division-multiplexed wavelengths λ2, λ3, . . .

Figure 4:
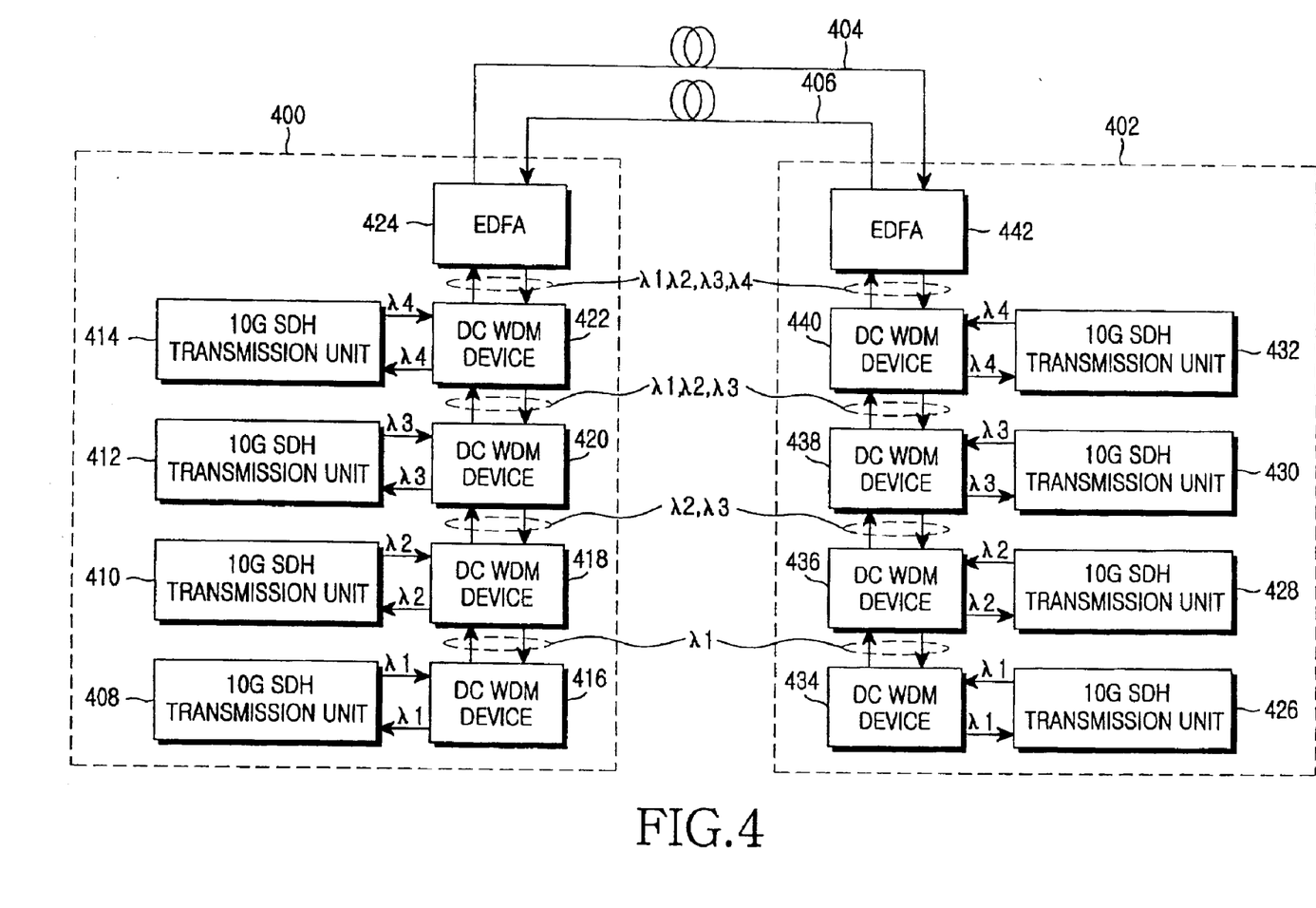
FIG. 4 is a block diagram illustrating the construction of DC WDM systems adopting the DC WDM device according to the preferred embodiment of the invention.

FIG. 4 illustrates an exemplary construction of DC WDM systems each adopting the above DC WDM device, in which the DC WDM systems 400 and 402 are connected to each other via optical transmission channels 404 and 406 for transmitting/receiving WDM optical signals to/from (to and from) each other, and each of the DC WDM systems 400 and 402 has 4 Synchronous Digital Hierarchy transmission units respectively having a capacity of 10 Gbps (Gigabits per second) (hereinafter will be referred to as "10 G SDH transmission units"). The 10 G SDH transmission units 408, 410, 412, and 414 in the DC WDM system 400 are point-to-point connected to the 10 G SDH transmission units 426, 428, 430, and 432 in the DC WDM system 402 to transmit/receive (transmit and receive) the optical signals of fixed wavelengths. To each of the 10 G SDH transmission units 408, 410, 412, and 414 is correspondingly coupled each of DC WDM devices 416, 418, 420, and 422 as shown in FIG. 2. In the same manner, to each of the 10 G SDH transmission units 426, 428, 430, and 432 is correspondingly coupled each of DC WDM devices 434, 436, 438, and 440 as shown in FIG. 2. The DC WDM devices 416, 418, 420, 422 and 426, 428, 430, 432 are connected into the shape of Daisy Chains (DCs), in which the DC WDM device 422 of the DC WDM devices 416 to 422 is connected to the optical transmission channels 404 and 406 via an Erbium-Doped Fiber Amplifier or EDFA 424, and the DC WDM device 440 of the DC WDM devices 434 to 440 is connected to the optical transmission channels 404 and 406 via an EDFA 442.

As shown in FIG. 4, assuming that an optical signal of a wavelength λ1 is transmitted/received (transmitted or received or both transmitted and received) between a pair of 10 G SDH transmission device 408 and 426, an optical signal of a wavelength λ2 is transmitted/received between a pair of 10 G SDH transmission device 410 and 428, an optical signal of a wavelength λ3 is transmitted/received between a pair of 10 G SDH transmission device 412 and 430, and an optical signal of a wavelength λ4 is transmitted/received between a pair of 10 G SDH transmission device 414 and 432, a WDM optical signal having the wavelength-division-multiplexed wavelengths λ1~λ4 is transmitted/received between the DC WDM system 400 and 402 via the optical transmission channels 404 and 406.

Herein, the operation of the DC WDM devices 416 and 434 will be described. The WDM input terminal and the WDM output terminal of each of the DC WDM devices 416 and 434 comprised as shown in FIG. 2 are opened while the optical signal input terminal and the optical signal output terminal are coupled to each of the 10 G SDH transmission units 408 and 426 to transmit/receive the optical signal of the wavelength λ1 into/from (into or from or both into and from) the 10 G SDH transmission unit 408 or 426, the WDM output terminal and the WDM input terminal are respectively connected to the WDM input terminal and the WDM output terminal of each of the DC WDM device 418 or 436. Therefore, the DC WDM device 416 or 434 receives the optical signal of the wavelength λ1 inputted into the optical signal input terminal from the 10 G SDH transmission units 408 or 426 so as to transmit the same as a WDM optical signal through the wavelength-division-multiplexing into the DC WDM device 418 or 436. On the other hand, the DC WDM device 418 or 436 receives the WDM optical signal with the wavelength λ1 being wavelength-division-multiplxeded only so as to output the optical signal of the wavelength λ1 to the 10 G SDH transmission units 408 or 426.

The DC WDM device 418 or 436 executes the wavelength-division-multiplexing to the WDM optical signal of the wavelength-division-multiplexed wavelength λ1 inputted from the DC WDM device 416 or 434 and the optical signal of the wavelength λ2 inputted from each of the 10G SDH transmission units 410 and 428 so as to output a WDM optical signal of the wavelength-division-multiplexed wavelengths λ1 and λ2 to each of the DC WDM devices 420 and 438. Also, the DC WDM device 418 or 436 divides a WDM optical signal inputted from the DC WDM device 420 or 438 into an optical signal of the wavelength λ2 and a WDM optical signal of the wavelength λ1 so as to output the optical signal of the wavelength λ2 to the 10 G SDH transmission device 410 or 428 and the WDM optical signal of the wavelength λ1 to the DC WDM device 420 or 438.

The remaining DC WDM devices 420 and 438 and the DC WDM devices 422 and 440 operate in the same manner as above except for wavelengths subjected to the wavelength-division-multiplexing/demultiplexing or the input/output thereof, and thus detailed description thereof will be excluded hereinafter.

The following will describe a situation where the pair of DC WDM systems 400 and 402 as set forth above are respectively provided with one more 10 G SDH transmission unit for transmitting/receiving an optical signal of a wavelength other than the above wavelengths λ1 to λ4, for example, λ5 in order to enlarge the transmission capacity while operate the four 10 G SDH transmission units 408 to 414 and 426 to 432. Each of the additional DC WDM devices is coupled to each of the 10 G SDH transmission unit pair subjected to enlargement. One of the additional DC WDM devices is connected between the DC WDM device 422 and the EDFA 424, and the other one of the additional DC WDM devices is connected between the DC WDM device 440 and the EDFA 442. Alternatively, each additional DC WDM may be connected between the other DC WDM devices or to the unused WDM input and output terminals 208 and 220 in the DC WDM device 416 or 434.

When the DC WDM devices 200 each are correspondingly coupled to the transmission unit pairs each for performing the point-to-point connection in the metro/access area as set forth above and the DC WDM devices respectively coupled to the transmission units are connected to one another into the shape of a daisy chain or DC, conventional transmission units can be simply added with a WDM function to enlarge the transmission capacity though the WDM system shown in FIG. 1 is not installed. Since the metro/access area has a transmission distance shorter than that of the basic network, the DC WDM device is a cheap passive optical device unlike the WDM multiplexer 108 and the WDM demultiplexer 118 in FIG. 1. Alternatively, the DC WDM device can adopt a power-off device. Further, the DC WDM device has only a function of wavelength-division-multiplexing the optical signal of the fixed wavelength to the WDM optical signal and wavelength-division-demultiplexing the WDM optical signal to the optical signal of the fixed wavelength rather than wavelength-division-multiplexing/demultiplexing the optical signal of a plurality of channels as the WDM multiplexer 108 and the WDM demultiplexer 118 in FIG. 1. Therefore, when it is necessary to enlarge the transmission capacity, the DC WDM device is coupled to each of the transmission unit pair which will be newly point-to-point connected as well as to other DC WDM devices in the DC shape. This allows the enlargement to be carried out without stopping a present service.

Figure 3:
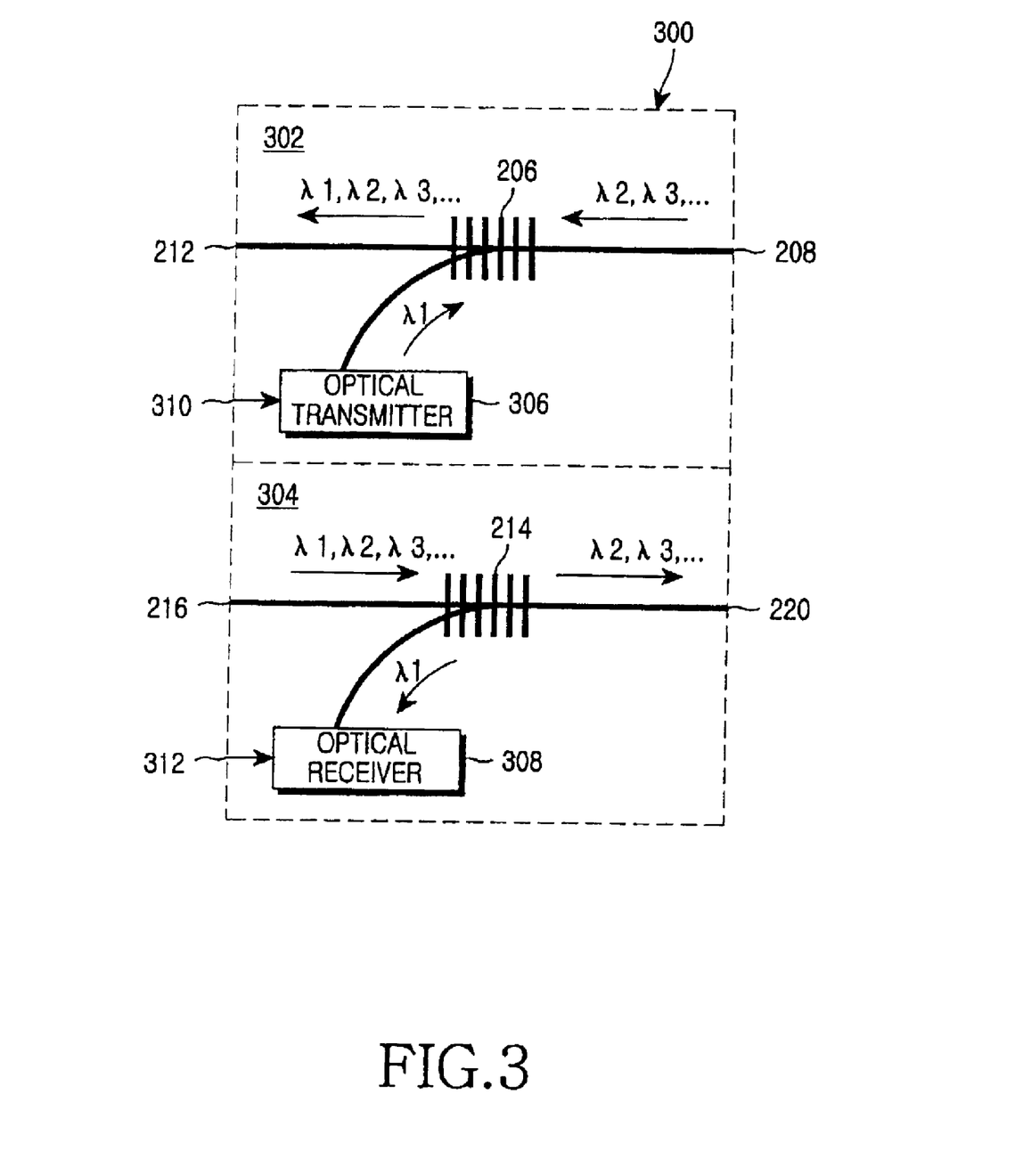
FIG. 3 illustrates the construction of a DC WDM device according to an alternative embodiment of the invention.

In the meantime, the optical transmitter and the optical receiver currently used in the transmitting unit to be enlarged may be unavailable for the WDM. In this case, a DC WDM device 300 having an optical transmitter 306 and an optical receiver 308 is used as shown in FIG. 3. A WDM coupler module 302 of the DC WDM device 300 in FIG. 3 is constructed by adding the optical transmitter 306 to the WDM coupler module 202 in FIG. 2 and installing an electric signal input terminal 310 for inputting an electric signal from the transmission unit instead of the optical signal input terminal 210. The optical transmitter 306 transforms the electric signal inputted to the electric signal input terminal 310 into an optical signal of a fixed wavelength, and applies the transformed optical signal to the WDM coupler 206. Further, a WDM coupler module 304 of the DC WDM device 300 is constructed by adding the optical receiver 308 to the WDM coupler module 204 and installing an electric signal output terminal 312 for outputting an electric signal to the transmission unit instead of the optical signal output terminal 218. The optical receiver 308 transforms an optical signal divided by the WDM coupler 214 into the electric signal, and outputs the transformed electric signal to an electric signal output terminal 312.

Figure 5:
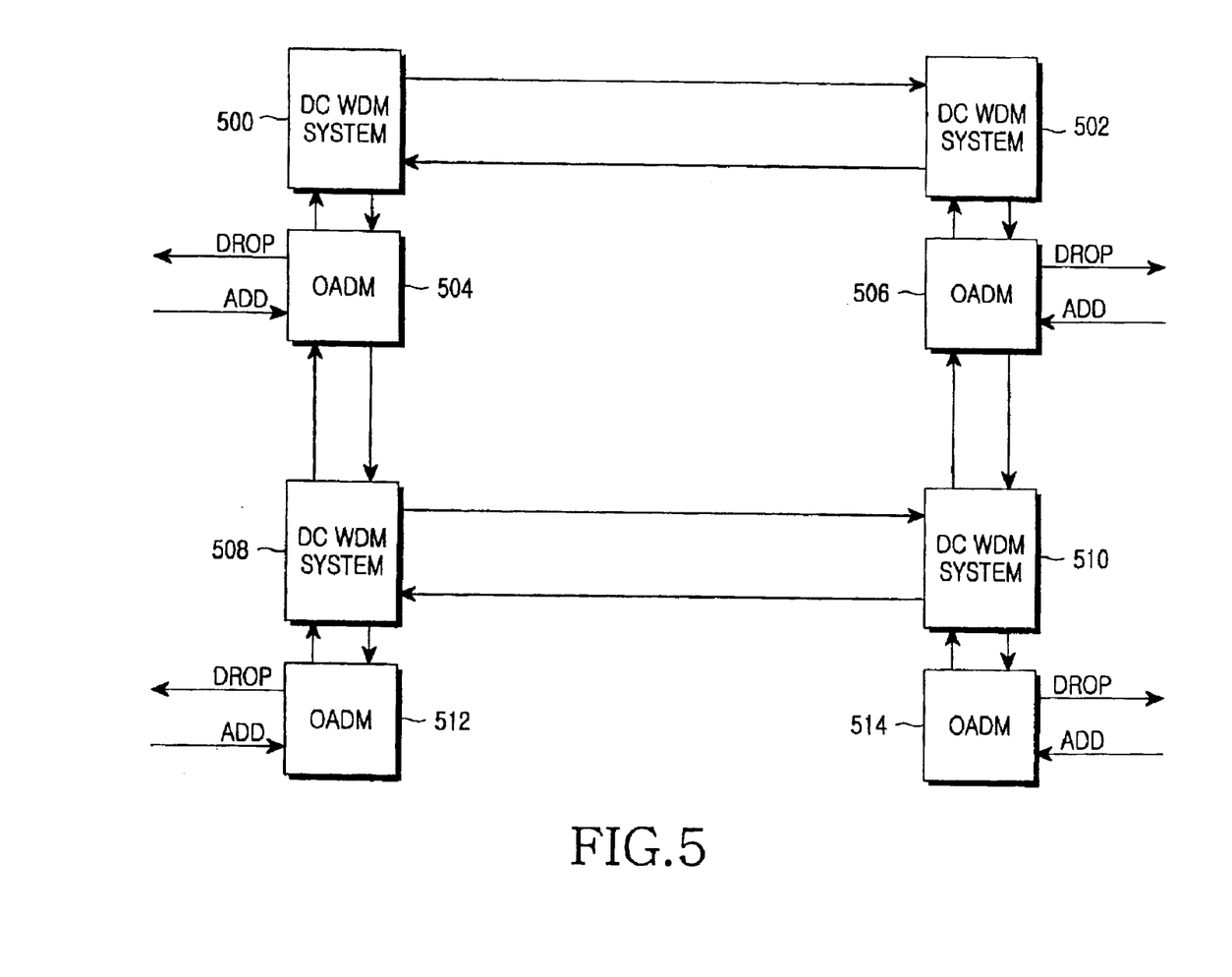
FIG. 5 is a block diagram illustrating the construction of a DC WDM system adopting the DC WDM device according to the alternative embodiment of the invention.

In the meantime, a plurality of DC WDM device of the invention can be used to construct a ring-type transmission network capable of executing optical add/drop as shown in FIG. 5 as well as the DC WDM system for executing the point-to-point connection as shown in FIG. 4.

FIG. 5 illustrates the construction of an exemplary DC WDM transmission network adopting the DC WDM devices according to the alternative embodiment of the invention. In FIG. 5, the DC WDM transmission network is constructed by connecting a pair of Optical Add/Drop Multiplexers (OADM) 504 and 506 between a pair of DC WDM systems 500 and 502 and another pair of DC WDM systems 508 and 510 while connecting an OADM 512 to the DC WDM system 508 and an OADM 514 to a DC WDM system 510. The OADM 504 adds/drops a WDM optical signal transmitted between the DC WDM system 500 and the DC WDM system 508, and the OADM 506 adds/drops a WDM optical signal transmitted between the DC WDM system 502 and the DC WDM system 510.

As set forth above, the present invention can advantageously realize the WDM system which can disperse the wavelength-division-multiplexing/demultiplexing function across the conventional transmission units by connecting the optical signals in the DC shape while use the transmission units in the point-to-point connection to simply add the WDM function thereby enlarging the transmission capacity. Further, the WDM system can be enlarged without stopping a present service.

Although the preferred embodiments of the present invention have been disclosed in the detailed description of the invention, those skilled in the art will appreciate that various modifications, additions and substitutions can be made without departing from the scope and spirit of the invention. In particular, although the DC WDM devices are applied, for example, to embody the transmission systems in FIG. 4 and the transmission network in FIG. 5 in the embodiments of the invention, they can be alternatively applied in various forms. Therefore, the scope of the invention shall not be defined by the above disclosed embodiments but by the accompanying claims and equivalents thereof.

What is claimed is:

1. A Daisy Chain Wavelength-Division-Multiplexing device, comprising:
   a first Wavelength-Division-Multiplexing coupler module for inputting a first Wavelength-Division-Multiplexing optical signal subjected to transmission and a first optical signal of a fixed wavelength to wavelength-division-multiplex the signals; and
   a second Wavelength-Division-Multiplexing coupler module for demultiplexing a transmitted Wavelength-Division-Multiplexing optical signal to divide the same into a second optical signal of the fixed wavelength and a second Wavelength-Division-Multiplexing optical signal of the remaining wavelengths.

2. The Daisy Chain Wavelength-Division-Multiplexing device according to claim 1,
   wherein said first Wavelength-Division-Multiplexing coupler module comprises:
     a first Wavelength-Division-Multiplexing input terminal for inputting the first Wavelength-Division-Multiplexing optical signal subjected to transmission;
     an optical signal input terminal for inputting the first optical signal of the fixed wavelength;
     a first Wavelength-Division-Multiplexing coupler for wavelength-division-multiplexing the first Wavelength-Division-Multiplexing optical signal inputted to said first Wavelength-Division-Multiplexing input terminal and the first optical signal inputted to said optical signal input terminal; and
     a first Wavelength-Division-Multiplexing output terminal for outputting a third Wavelength-Division-Multiplexing optical signal multiplexed in said first Wavelength-Division-Multiplexing coupler, and
   wherein said second Wavelength-Division-Multiplexing coupler module comprises:
     a second Wavelength-Division-Multiplexing input terminal for inputting the transmitted Wavelength-Division-Multiplexing optical signal;
     a second Wavelength-Division-Multiplexing coupler for demultiplexing the transmitted Wavelength-Division-Multiplexing optical signal inputted to said second Wavelength-Division-Multiplexing input terminal to divide the same into the second optical signal of the fixed wavelength and the Wavelength-Division-Multiplexing optical signal of the remaining wavelengths;
     an optical signal output terminal for outputting the second optical signal of the fixed wavelength divided in said second Wavelength-Division-Multiplexing coupler; and
     a second Wavelength-Division-Multiplexing output terminal for outputting the second Wavelength-Division-Multiplexing optical signal of the remaining wavelengths divided in said second Wavelength-Division-Multiplexing coupler.

3. The Daisy Chain Wavelength-Division-Multiplexing device according to claim 2, wherein said first Wavelength-Division-Multiplexing coupler transmits the first Wavelength-Division-Multiplexing optical signal inputted to said first Wavelength-Division-Multiplexing input terminal toward said first Wavelength-Division-Multiplexing output terminal while reflects the first optical signal inputted to said optical signal input terminal toward said first Wavelength-Division-Multiplexing output terminal, and
   wherein said second Wavelength-Division-Multiplexing coupler reflects the second optical signal of the fixed wavelength of the transmitted Wavelength-Division-Multiplexing optical signal inputted to said second Wavelength-Division-Multiplexing input terminal toward said optical signal output terminal while transmits the second Wavelength-Division-Multiplexing optical signal of the remaining wavelengths toward said second Wavelength-Division-Multiplexing output terminal.

4. A Daisy Chain Wavelength-Division-Multiplexing device comprising:

a first Wavelength-Division-Multiplexing coupler module for inputting a first Wavelength-Division-Multiplexing optical signal subjected to transmission, transforming an inputted electric signal into a first optical signal, and wavelength-division-multiplexing the first Wavelength-Division-Multiplexing optical signal with the first optical signal; and a second Wavelength-Division-Multiplexing coupler module for demultiplexing a transmitted Wavelength-Division-Multiplexing optical signal to divide the same into a second optical signal of the fixed wavelength and a second Wavelength-Division-Multiplexing optical signal of the remaining wavelengths while outputting a second electric signal transformed from the second optical signal of the fixed wavelength.

5. The Daisy Chain Wavelength-Division-Multiplexing device according to claim 4, wherein said first Wavelength-Division-Multiplexing coupler module comprises:

a first Wavelength-Division-Multiplexing input terminal for inputting the first Wavelength-Division-Multiplexing optical signal subjected to transmission;

an electric signal input terminal for inputting the first electric signal subjected to wavelength-division-multiplexing with the first Wavelength-Division-Multiplexing optical signal;

an optical transmitter for transforming the first electric signal inputted to said electric signal input terminal into the first optical signal of the fixed wavelength;

a first Wavelength-Division-Multiplexing coupler for wavelength-division-multiplexing the first Wavelength-Division-Multiplexing optical signal inputted to said first Wavelength-Division-Multiplexing input terminal with the first optical signal outputted from said optical receiver; and a first Wavelength-Division-Multiplexing output terminal for outputting a third Wavelength-Division-Multiplexing optical signal multiplexed in said first Wavelength-Division-Multiplexing coupler into a transmission channel, and wherein said second Wavelength-Division-Multiplexing coupler module comprises:

a second Wavelength-Division-Multiplexing input terminal for inputting the transmitted Wavelength-Division-Multiplexing optical signal;

a second Wavelength-Division-Multiplexing coupler for demultiplexing the transmitted Wavelength-Division-Multiplexing optical signal inputted to said second Wavelength-Division-Multiplexing input terminal to divide the same into the second optical signal of the fixed wavelength and the second Wavelength-Division-Multiplexing optical signal of the remaining wavelengths;

an optical receiver for transforming the second optical signal of the fixed wavelength divided in said second Wavelength-Division-Multiplexing coupler into the second electric signal;

an electric signal output terminal for outputting the second electric signal transformed in said optical receiver; and a second Wavelength-Division-Multiplexing coupler for outputting the second Wavelength-Division-Multiplexing optical signal of the remaining wavelengths demultiplexed in said second Wavelength-Division-Multiplexing coupler.

6. The Daisy Chain Wavelength-Division-Multiplexing device according to claim 5, wherein said first Wavelength-Division-Multiplexing coupler transmits the first Wavelength-Division-Multiplexing optical signal inputted to said first Wavelength-Division-Multiplexing input terminal toward said first Wavelength-Division-Multiplexing output terminal while reflects the first optical signal inputted from said optical transmitter toward said first Wavelength-Division-Multiplexing output terminal, and wherein said second Wavelength-Division-Multiplexing coupler reflects the second optical signal of the fixed wavelength of the transmitted Wavelength-Division-Multiplexing optical signal inputted to said second Wavelength-Division-Multiplexing input terminal toward said optical receiver while transmits the second Wavelength-Division-Multiplexing optical signal of the remaining wavelengths toward said second Wavelength-Division-Multiplexing output terminal.

7. A Daisy Chain Wavelength-Division-Multiplexing system, comprising:

a pair of Daisy Chain Wavelength-Division-Multiplexing sub-systems connected to each other via optical transmission and receiving channels for transmitting and receiving Wavelength-Division-Multiplexing optical signals, wherein one of the Daisy Chain Wavelength-Division-Multiplexing sub-systems comprises:

a plurality of transmission units for transmission and receiving optical signals of fixed wavelengths into and from corresponding transmission units of the other Daisy Chain Wavelength-Division-Multiplexing sub-system;

a plurality of Daisy Chain Wavelength-Division-Multiplexing devices connected to one another into the shape of a daisy chain while coupled to said transmission units in one-to-one relation; and a fiber amplifier connected between said optical transmission and receiving channels and one of said Daisy Chain Wavelength-Division-Multiplexing devices subjected to connection to said channels, and with each of said Daisy Chain Wavelength-Division-Multiplexing devices comprising:

a first Wavelength-Division-Multiplexing coupler module for inputting a first Wavelength-Division-Multiplexing optical signal subjected to transmission into said optical transmission channel from an upstream one of said Daisy Chain Wavelength-Division-Multiplexing devices, inputting a first optical signal of a fixed wavelength from a corresponding one of said transmission units, wavelength-division-multiplexing the first Wavelength-Division-Multiplexing optical signal and the first optical signal, and outputting a second Wavelength-Division-Multiplexing optical signal to a downstream one of said Daisy Chain Wavelength-Division-Multiplexing devices or said fiber amplifier; and a second Wavelength-Division-Multiplexing coupler module for demultiplexing a third Wavelength-Division-Multiplexing optical signal transmitted from said optical receiving channel via said fiber amplifier or said upstream Daisy Chain Wavelength-Division-Multiplexing device to divide the same into a second optical signal of the fixed wavelength and a fourth Wavelength-Division-Multiplexing optical signal of the remaining wavelengths, outputting the second optical signal of the fixed wavelength into said corresponding transmission unit, and outputting the fourth Wavelength-Division-Multiplexing optical signal of the remaining wavelengths to said downstream Daisy Chain Wavelength-Division-Multiplexing device.

8. The Daisy Chain Wavelength-Division-Multiplexing system according to claim 7,
wherein said first Wavelength-Division-Multiplexing coupler module comprises:
a first Wavelength-Division-Multiplexing input terminal for inputting the first Wavelength-Division-Multiplexing optical signal subjected to transmission from said upstream Daisy Chain Wavelength-Division-Multiplexing device into said optical transmission channel;
an optical signal input terminal for inputting the first optical signal of the fixed wavelength subjected to wavelength-division-multiplexing with the first Wavelength-Division-Multiplexing optical signal from said corresponding transmission unit;
a first Wavelength-Division-Multiplexing coupler for wavelength-division-multiplexing the first Wavelength-Division-Multiplexing optical signal inputted to said first Wavelength-Division-Multiplexing input terminal and the first optical signal inputted to said optical signal input terminal; and
a first Wavelength-Division-Multiplexing output terminal for outputting the second Wavelength-Division-Multiplexing optical signal multiplexed in said first Wavelength-Division-Multiplexing coupler to said downstream Daisy Chain Wavelength-Division-Multiplexing device or said fiber amplifier, and
wherein said second Wavelength-Division-Multiplexing coupler module comprises:
a second Wavelength-Division-Multiplexing input terminal for inputting the third Wavelength-Division-Multiplexing optical signal transmitted from said optical receiving channel via said fiber amplifier or said upstream Daisy Chain Wavelength-Division-Multiplexing device;
a second Wavelength-Division-Multiplexing coupler for demultiplexing the third Wavelength-Division-Multiplexing optical signal inputted to said second Wavelength-Division-Multiplexing input terminal to divide the same into the second optical signal of the fixed wavelength and the fourth Wavelength-Division-Multiplexing optical signal of the remaining wavelengths;
an optical signal output terminal for outputting the second optical signal of the fixed wavelength divided in said second Wavelength-Division-Multiplexing coupler to said corresponding transmission unit; and
a second Wavelength-Division-Multiplexing output terminal for outputting the fourth Wavelength-Division-Multiplexing optical signal of the remaining wavelengths divided in said second Wavelength-Division-Multiplexing coupler to said downstream Daisy Chain Wavelength-Division-Multiplexing device.

9. The Daisy Chain Wavelength-Division-Multiplexing system according to claim 8,
wherein said first Wavelength-Division-Multiplexing coupler transmits the first Wavelength-Division-Multiplexing optical signal inputted to said first Wavelength-Division-Multiplexing input terminal toward said downstream Wavelength-Division-Multiplexing device or said fiber amplifier while reflects the first optical signal inputted to said optical signal input terminal toward said downstream Wavelength-Division-Multiplexing device or said fiber amplifier, and
wherein said second Wavelength-Division-Multiplexing coupler reflects the second optical signal of the fixed wavelength of the third Wavelength-Division-Multiplexing optical signal inputted to said second Wavelength-Division-Multiplexing input terminal toward said optical signal output terminal while transmits the fourth Wavelength-Division-Multiplexing optical signal of the remaining wavelengths toward said second Wavelength-Division-Multiplexing output terminal.

* * * * *